(12) United States Patent
Papple et al.

(10) Patent No.: US 11,199,096 B1
(45) Date of Patent: Dec. 14, 2021

(54) TURBOMACHINE BLADE

(71) Applicant: United Technologies Corporation, Farmington, CT (US)

(72) Inventors: Michael Leslie Clyde Papple, Verdun (CA); David A. Niezelski, Manchester, CT (US); Daniel Lecuyer, St. Bruno-de-Montarville (CA); XingYun Haggard, Jacksonville, FL (US); Domenico Di Florio, St Lazare (CA); Francois Caron, Longueuil (CA); John R. Battye, Lebanon, CT (US); Panagiota Tsifourdaris, Montreal (CA); Ghislain Plante, Verdun (CA); Timothy J. Jennings, West Hartford, CT (US); Rene Paquet, Montreal (CA)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 15/871,323

(22) Filed: Jan. 15, 2018

Related U.S. Application Data

(60) Provisional application No. 62/447,092, filed on Jan. 17, 2017.

(51) Int. Cl.
*F01D 5/28* (2006.01)
*F01D 5/16* (2006.01)
(Continued)

(52) U.S. Cl.
CPC ............... *F01D 5/16* (2013.01); *F01D 5/141* (2013.01); *F01D 5/186* (2013.01); *F01D 5/28* (2013.01);
(Continued)

(58) Field of Classification Search
CPC ........ F01D 5/16; F04D 29/324; F04D 29/328; F04D 29/668; F02C 3/06; F02K 3/06;
(Continued)

(56) References Cited

U.S. PATENT DOCUMENTS

| 3,044,746 A | 7/1962 | Stargardter |
| 3,367,629 A | 2/1968 | Partington |

(Continued)

OTHER PUBLICATIONS

Jaiswal et al, "Design and Analysis of Stator, Rotor and Blades of the Axial flow Compressor", International Journal of Engineering Development and Research, 2013 (Year: 2013).*

(Continued)

*Primary Examiner* — Woody A Lee, Jr.
*Assistant Examiner* — Justin A Pruitt
(74) *Attorney, Agent, or Firm* — Bachman & LaPointe, P.C.

(57) ABSTRACT

A turbomachine airfoil element comprises an airfoil having: an inboard end; an outboard end; a leading edge; a trailing edge; a pressure side; and a suction side. A span between the inboard end and the outboard end is 1.75-2.20 inches. A chord length at 50% span is 1.05-1.35 inches. At least two of: a first mode resonance frequency is 2400±10% Hz; a second mode resonance frequency is 4950±10% Hz; a third mode resonance frequency is 7800±10% Hz; a fourth mode resonance frequency is 8700±10% Hz; and a fifth mode resonance frequency is 12500±10% Hz.

13 Claims, 5 Drawing Sheets

(51) Int. Cl.
*F01D 5/14* (2006.01)
*F01D 5/18* (2006.01)

(52) U.S. Cl.
CPC .... *F05D 2230/90* (2013.01); *F05D 2240/301* (2013.01); *F05D 2260/202* (2013.01); *F05D 2260/96* (2013.01); *F05D 2300/175* (2013.01)

(58) Field of Classification Search
CPC ............. F05D 2220/32; F05D 2230/80; F05D 2300/175; F05D 2300/501; F05D 2300/522
USPC ......................................................... 415/119
See application file for complete search history.

(56) References Cited

U.S. PATENT DOCUMENTS

| | | | |
|---|---|---|---|
| 3,536,414 | A | 10/1970 | Smith, Jr. |
| 3,574,482 | A | 4/1971 | Savage et al. |
| 3,588,278 | A | 6/1971 | Ortolano et al. |
| 3,847,506 | A | 11/1974 | Straniti |
| 4,023,249 | A * | 5/1977 | Darrow .................. B23P 15/04 29/889.721 |
| 4,097,192 | A * | 6/1978 | Kulina ...................... F01D 5/14 416/175 |
| 4,321,311 | A | 3/1982 | Strangman |
| 4,839,245 | A | 6/1989 | Sue et al. |
| 4,921,405 | A | 5/1990 | Wilson |
| 4,924,706 | A | 5/1990 | Moore |
| 5,160,242 | A | 11/1992 | Brown |
| 5,286,168 | A | 2/1994 | Smith |
| 5,490,764 | A | 2/1996 | Schilling |
| 5,915,452 | A | 6/1999 | Conroy et al. |
| 5,988,982 | A * | 11/1999 | Clauer .................. C21D 10/005 219/121.62 |
| 6,004,101 | A | 12/1999 | Schilling et al. |
| 6,033,186 | A | 3/2000 | Schilling et al. |
| 6,234,753 | B1 | 5/2001 | Lee |
| 6,339,878 | B1 | 1/2002 | Owen et al. |
| 6,354,780 | B1 | 3/2002 | Davis et al. |
| 6,532,656 | B1 | 3/2003 | Wilkins et al. |
| 6,814,543 | B2 | 11/2004 | Barb et al. |
| 7,444,802 | B2 | 11/2008 | Parry |
| 7,632,071 | B2 | 12/2009 | Charbonneau et al. |
| 7,718,280 | B2 | 5/2010 | Wilson |
| 7,824,147 | B2 | 11/2010 | Morris et al. |
| 8,043,063 | B2 | 10/2011 | Kelly et al. |
| 8,113,780 | B2 | 2/2012 | Cherolis et al. |
| 8,573,945 | B2 | 11/2013 | Wang et al. |
| 8,602,740 | B2 | 12/2013 | O'Hearn et al. |
| 8,863,491 | B2 | 10/2014 | Merry et al. |
| 8,944,762 | B2 | 2/2015 | Suciu et al. |
| 8,950,069 | B2 | 2/2015 | Ress, Jr. |
| 9,394,793 | B1 | 7/2016 | Atkins et al. |
| 9,506,347 | B2 | 11/2016 | Key |
| 10,215,189 | B2 | 2/2019 | Dutka et al. |
| 2002/0064458 | A1 | 5/2002 | Montgomery et al. |
| 2005/0135928 | A1 | 6/2005 | Servadio et al. |
| 2005/0254955 | A1 | 11/2005 | Helder et al. |
| 2006/0073022 | A1 | 4/2006 | Gentile et al. |
| 2006/0280606 | A1 | 12/2006 | Busbey et al. |
| 2007/0084582 | A1 | 4/2007 | Govern et al. |
| 2007/0175032 | A1 | 8/2007 | Kurt-Elli |
| 2008/0286108 | A1 | 11/2008 | Lui et al. |
| 2009/0155082 | A1 | 6/2009 | Duong et al. |
| 2010/0129554 | A1 * | 5/2010 | Ahmad ...................... F01D 5/16 427/289 |
| 2010/0239422 | A1 | 9/2010 | Reyes et al. |
| 2011/0116145 | A1 * | 5/2011 | Fujii .................. G02B 26/0833 359/197.1 |
| 2011/0268562 | A1 | 11/2011 | Knight, III et al. |
| 2011/0293436 | A1 | 12/2011 | Di Florio et al. |
| 2012/0057982 | A1 | 3/2012 | O'Hearn et al. |
| 2012/0082556 | A1 | 4/2012 | Macchia et al. |
| 2012/0308390 | A1 | 12/2012 | Asai et al. |
| 2013/0149132 | A1 | 6/2013 | Webster |
| 2014/0248129 | A1 | 9/2014 | Merry et al. |
| 2014/0259589 | A1 | 9/2014 | Xu et al. |
| 2015/0040582 | A1 | 2/2015 | Dong et al. |
| 2015/0089809 | A1 * | 4/2015 | Guo ........................ B23P 15/02 29/889.7 |
| 2015/0114002 | A1 | 4/2015 | Schwarz et al. |
| 2015/0198047 | A1 | 7/2015 | Roche |
| 2015/0285085 | A1 | 10/2015 | Bentley |
| 2015/0328717 | A1 | 11/2015 | Shepler et al. |
| 2015/0345297 | A1 | 12/2015 | Neubrand et al. |
| 2016/0024971 | A1 | 1/2016 | Pearce et al. |
| 2016/0208741 | A1 | 7/2016 | Sabnis |
| 2016/0222978 | A1 | 8/2016 | Drozdenko et al. |
| 2017/0276070 | A1 | 9/2017 | Nolcheff et al. |
| 2017/0292530 | A1 | 10/2017 | Pope |

OTHER PUBLICATIONS

FAA, Advisory Circular 33.83A, Sep. 29, 2006 (Year: 2006).*
Peters, Investigation of Advanced Processed Single-Crystal Turbine Blade Alloys, Dec. 1995, NASA Report Document Page, Pages v, 1, 2, 5, 6, 7, & 82 (Year: 1995).*
Nickel Development Institute, High-Temperature High-Strength Nickel Base Alloys, 1995, 1995 Supplement, No. 393, p. 4 (Year: 1995).*
FAA Advisory Circular 33.83-1, Comparative Method to Show Equivalent Vibratory Stresses and High Cycle Fatigue Capability for Parts Manufacturer Approval of Turbine Engine and Auxiliary Power Unit Parts, Sep. 8, 2009, Federal Aviation Administration, Washington, D.C.
US Office Action dated Sep. 4, 2015 for U.S. Appl. No. 13/854,354.
US Office Action dated Sep. 21, 2016 for U.S. Appl. No. 15/211,510.
US Office Action dated Apr. 25, 2017 for U.S. Appl. No. 15/211,510.
US Office Action dated May 14, 2019 for U.S. Appl. No. 15/871,260.
US Office Action dated Aug. 7, 2019 for U.S. Appl. No. 15/871,518.
US Office Action dated Aug. 29, 2019 for U.S. Appl. No. 15/871,491.
US Office Action dated Oct. 2, 2019 for U.S. Appl. No. 15/871,336.
US Office Action dated Oct. 3, 2019 for U.S. Appl. No. 15/871,505.
US Office Action dated Nov. 26, 2019 for U.S. Appl. No. 15/871,260.
R.S. Mohan et al., "Vibration Analysis of a Steam Turbine Blade", Inter-Noise and Noise-Con Congress and Conference Proceedings, Nov. 2014, vol. 249. No 7, Institute of Noise Control Engineering, Washington, DC.
Warner L. Stewart et al., "Blade Design, Turbine Design and Application", Chapter 4, pp. 101-125, Jun. 1994, NASA, Washington, D C.
Tsu-Chien Cheu et al., "Design Optimization of Gas Turbine Blades with Geometry and Natural Frequency Constraints", Conference Paper, Gas Turbine and Aeroengine Conference, Jun. 1988, American Society of Mechanical Engineers, New York, NY.
Ujjawal A. Jaiswal et al., Design and Analysis of Stator, Rotor and Blades of the Axial flow Compressor, Aug. 2014, vol. 1, Issue 1, International Journal of Engineering Development and Research.
Matweb, "Titanium Ti-6AI-4V (Grade 5), Annealed", MatWeb, LLC, Blacksburg, Virginia, retrieved from internet http://www.matweb.com/search/datasheet.aspx?MatGUID=a0655d261898456b958e5f825ae85390, Aug. 23, 2019.
Nageswara Rao Muktinutalapati, "Materials for Gas Turbines—An Overview", Advances in Gas Turbine Technology, Ernesto Benini editor, Nov. 2011, pp. 293-314, Intech, Rijeka, Croatia.
"Inconel Alloy 718", Sep. 2007, Special Metals Corporation, New Hartford, New York.
"6061 aluminum alloy", Feb. 2014, Wikipedia retrieved from internet https://web.archive.org/web/20140205075632/https://en.wikipedia.org/wiki/6061_aluminum_alloy, Sep. 16, 2019.
Leye M. Amoo, "On the Design and Structural Analysis of Jet Engine Fan Blade Structures", Progress in Aerospace Sciences, Jul. 2013, pp. 1-11, vol. 60, Elsevier, Amsterdam, Netherlands.
"ASM Aluminum 7075-T6", ASM Aerospace Specification Metals Inc., Metals Handbook, 1990, vol. 2, ASM Material Data Sheet, ASM, Materials Park, Ohio, reprinted by MatWeb, LLC, Blacksburg, Virginia, retrieved from internet http://asm.matweb.com/search/

(56) References Cited

OTHER PUBLICATIONS

SpecificMaterial.asp?bassnum=MA7075T6, Aug. 28, 2019.
"Inconel 718 Technical Data", Mar. 7, 2015, High Temp Metals, Sylmar, California, retrieved from internet https://web.archive.org/web/20150307164326/http://www.hightempmetals.com/techdata/hitempinconel718data.php, May 23, 2019.
Azom, "Titanium Alloys—Physical Properties", Apr. 2002, Special Metals Corporation, New Hartford, New York, retrived from internet https://www.azom.com/article.aspx?articleid=1341, Jun. 3, 2019.
Kurt B. Hinkle, "An Automated Method for Optimizing Compressor Blade Tuning", Thesis, Mar. 2016, Brigham Young University, Provo, Utah.

\* cited by examiner

TURBOMACHINE BLADE

CROSS-REFERENCE TO RELATED APPLICATION

Benefit is claimed of U.S. Patent Application No. 62/447,092, filed Jan. 17, 2017, and entitled "Turbomachine Blade", the disclosure of which is incorporated by reference herein in its entirety as if set forth at length.

BACKGROUND

The disclosure relates to turbomachinery. More particularly, the disclosure relates to blades of gas turbine engines.

Gas turbine engine blades and vanes are subject to a number of performance-affecting conditions. They are subject to environmental exposure and thermal and mechanical loading. These factors are most significant in the context of turbine components wherein the environment comprises combustion gases and thermal exposure is high. For blades, rotational forces are an important dynamic stimulus.

Vibrational responses also reflect how components interact with each other. An exemplary vibrational testing method is defined in Unites States Federal Aviation Administration (FAA) Advisory Circular 38.83-1 (Sep. 8, 2009). Vibrational response of turbine blades may be designed of further basic parameters such as airfoil geometry and attachment configuration. Proper design prolongs the useful life of engine equipment.

SUMMARY

One aspect of the disclosure involves a turbomachine airfoil element comprising an airfoil having: an inboard end; an outboard end; a leading edge; a trailing edge; a pressure side; and a suction side. A span between the inboard end and the outboard end is 1.75-2.20 inches. A chord length at 50% span is 1.05-1.35 inches. At least two of: a first mode resonance frequency is 2400±10% Hz; a second mode resonance frequency is 4950±10% Hz; a third mode resonance frequency is 7800±10% Hz; a fourth mode resonance frequency is 8700±10% Hz; and a fifth mode resonance frequency is 12500±10% Hz.

In one or more embodiments of any of the other embodiments, at least three of said first, second, third, fourth, and fifth mode resonance frequencies are present.

In one or more embodiments of any of the other embodiments, all of said first, second, third, fourth, and fifth mode resonance frequencies are present.

In one or more embodiments of any of the other embodiments, said resonance frequencies are at zero speed and ambient conditions.

In one or more embodiments of any of the other embodiments, at a running speed/condition: the first mode resonance frequency is 2210±10% Hz; the second mode resonance frequency is 4810±10% Hz; the third mode resonance frequency is 7600±10% Hz; the fourth mode resonance frequency is 8400±10% Hz; and the fifth mode resonance frequency is 12000±10% Hz.

In one or more embodiments of any of the other embodiments, the element is a blade having an inboard attachment root.

In one or more embodiments of any of the other embodiments, the outboard end is a free tip.

In one or more embodiments of any of the other embodiments, the element is a casting.

In one or more embodiments of any of the other embodiments, the element is formed of a nickel-based superalloy.

In one or more embodiments of any of the other embodiments, the element further comprises a cooling passageway system in the airfoil.

In one or more embodiments of any of the other embodiments, cooling passageway system comprises: one or more inlets; and one or more outlets.

In one or more embodiments of any of the other embodiments, said first mode resonance frequency is 2400±5% Hz; said second mode resonance frequency is 4950±5% Hz; said third mode resonance frequency is 7600±5% Hz; said fourth mode resonance frequency is 8400±5% Hz; and said fifth mode resonance frequency is 12500±5% Hz.

Another aspect of the disclosure involves a turbomachine airfoil element comprising an airfoil having: an inboard end; an outboard end; a leading edge; a trailing edge; a pressure side; and a suction side. A span between the inboard end and the outboard end is 1.75-2.20. A chord length at 50% span is 1.05-1.35. At a running speed/condition at least two of: a first mode resonance frequency is 2210±10% Hz; a second mode resonance frequency is 4810±10% Hz; a third mode resonance frequency is 7600±10% Hz; a fourth mode resonance frequency is 8400±10% Hz; and a fifth mode resonance frequency is 12000±10% Hz.

Another aspect of the disclosure involves a turbomachine airfoil element comprising an airfoil having: an inboard end; an outboard end; a leading edge; a trailing edge; a pressure side; and a suction side. A span between the inboard end and the outboard end is 1.75-2.20 inches. A chord length at 50% span is 1.05-1.35 inches. In a running condition at least two of: a first mode resonance frequency is 2175±10% Hz; a second mode resonance frequency is 4500±10% Hz; a third mode resonance frequency is 7100±10% Hz; a fourth mode resonance frequency is 7800±10% Hz; and a fifth mode resonance frequency is 11150±10% Hz.

Another aspect of the disclosure involves a method for remanufacturing a turbomachine airfoil element comprising providing at least two of: a first mode resonance frequency is 2400±10% Hz; a second mode resonance frequency is 4950±10% Hz; a third mode resonance frequency is 7800±10% Hz; a fourth mode resonance frequency is 8700±10% Hz; and a fifth mode resonance frequency is 12500±10% Hz.

In one or more embodiments of any of the other embodiments, the providing comprises addition of superalloy.

In one or more embodiments of any of the other embodiments, the providing comprises removal of material after the addition.

In one or more embodiments of any of the other embodiments, the providing comprises measuring a frequency response after the addition and thereafter further modifying the airfoil via removing or adding superalloy.

In one or more embodiments of any of the other embodiments, the provided airfoil element has at least one unrestored mode frequency that is attributable to damage to the airfoil element. The at least one of the first mode frequency, second mode frequency, third mode frequency, fourth mode frequency, and fifth mode frequency corresponds to a restored mode frequency that supersedes the unrestored mode frequency.

In one or more embodiments of any of the other embodiments, the method further comprises applying a thermal barrier coating over the added superalloy.

The details of one or more embodiments are set forth in the accompanying drawings and the description below.

Other features, objects, and advantages will be apparent from the description and drawings, and from the claims.

DETAILED DESCRIPTION

Figure 5:
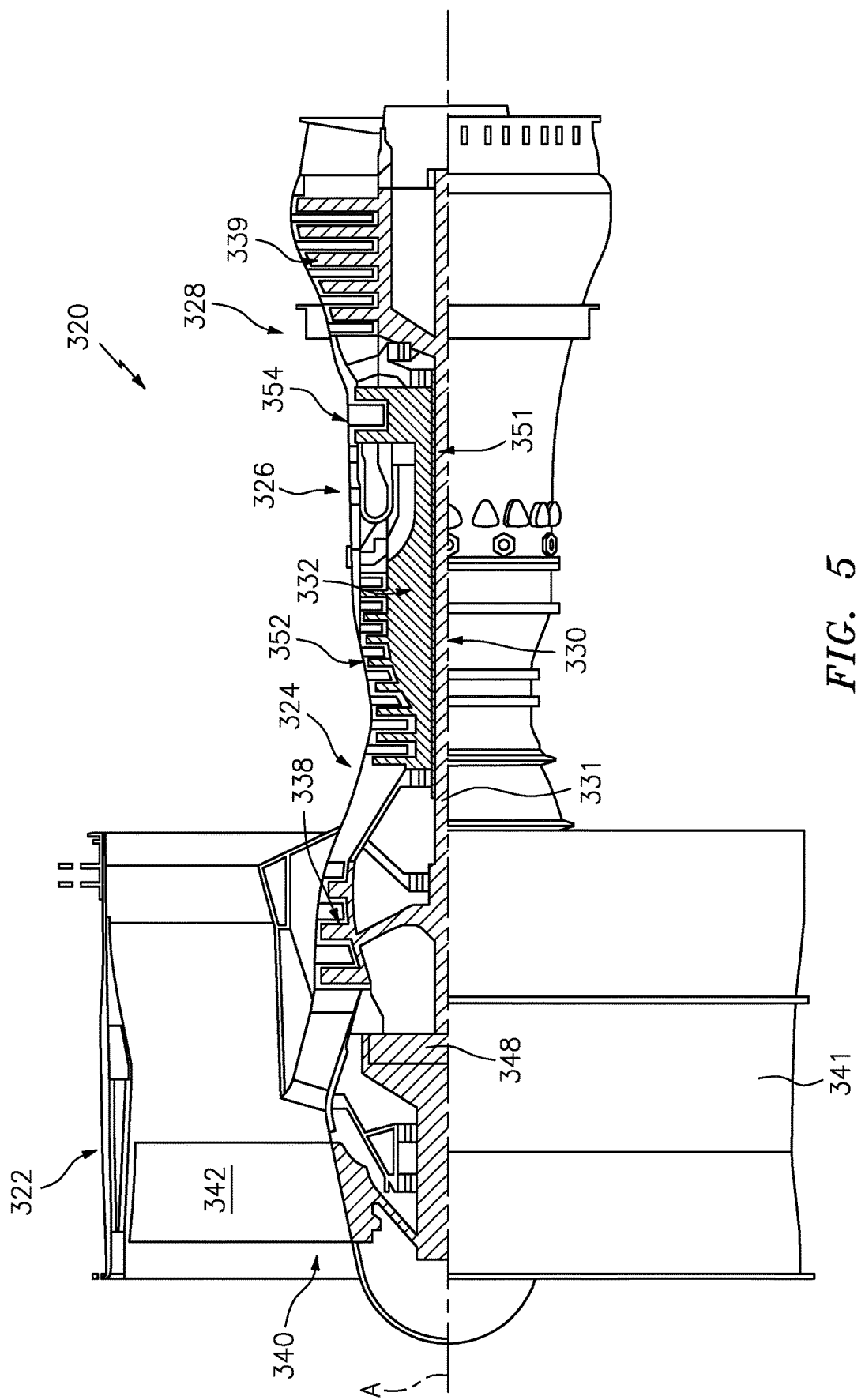
FIG. 5 is a schematic sectional view of a turbofan engine.
Like reference numbers and designations in the various drawings indicate like elements.

FIG. 5 schematically illustrates a gas turbine engine 320. The exemplary gas turbine engine 320 is a two-spool turbofan engine that generally incorporates a fan section 322, a compressor section 324, a combustor section 326 and a turbine section 328. Alternative engines might include an augmenter section (not shown) among other systems or features. The fan section 322 drives an inlet airflow to split with a bypass portion being driven along an outboard bypass flow path, while the core portion is further driven by the compressor section 324 along a core flow path for compression and communication into the combustor section 326. The hot combustion gases generated in the combustor section 326 are expanded through the turbine section 328. Although depicted as a turbofan gas turbine engine in the disclosed non-limiting embodiment, it should be understood that the concepts described herein are not limited to turbofan engines and these teachings could extend to other types of engines, including but not limited to, geared turbine engines having a geared architecture 348, three-spool engine architectures, and ground-based engines.

The exemplary fan section comprises a fan case 341 surrounding a fan 340 which comprises a circumferential array of fan blades 342. In the exemplary two-spool engine, the low pressure spool 330 comprises a shaft 331 joining the low pressure compressor (LPC) section 338 to the low pressure turbine (LPT) section 339. Similarly, the high speed spool 332 comprises a shaft 351 coupling the high pressure compressor section 352 to the high pressure turbine section 354.

In a non-limiting embodiment, the FIG. 5 gas turbine engine 320 is a high-bypass geared aircraft engine. In a further example, the gas turbine engine 320 bypass ratio is greater than about six (6:1). The geared architecture 348 can include an epicyclic gear train, such as a planetary gear system or other gear system. The example epicyclic gear train has a gear reduction ratio of greater than about 2.3, and in another example is greater than about 2.5:1. The exemplary geared architecture transmits driving torque from the low pressure spool to the fan with a geared reduction. The geared turbofan enables operation of the low speed spool 330 at higher speeds, which can increase the operational efficiency of the low pressure compressor 338 and low pressure turbine 339 and render increased pressure in a fewer number of stages.

The pressure ratio of the low pressure turbine 339 can be pressure measured prior to the inlet of the low pressure turbine 339 as related to the pressure at the outlet of the low pressure turbine 339 and prior to an exhaust nozzle of the gas turbine engine 320. In one non-limiting embodiment, the bypass ratio of the gas turbine engine 320 is greater than about ten (10:1), the fan diameter is significantly larger than that of the low pressure compressor 338, and the low pressure turbine 339 has a pressure ratio that is greater than about five (5:1). It should be understood, however, that the above parameters are only exemplary of one embodiment of a geared architecture engine and that the present disclosure is applicable to other gas turbine engines, including direct drive turbofans.

In this embodiment of the exemplary gas turbine engine 320, a significant amount of thrust is provided by the bypass flow path due to the high bypass ratio. The fan section 322 of the gas turbine engine 320 is designed for a particular flight condition—typically cruise at about 0.8 Mach and about 35,000 feet. This flight condition, with the gas turbine engine 320 at its best fuel consumption, is also known as bucket cruise thrust specific fuel consumption (TSFC). TSFC is an industry standard parameter of fuel consumption per unit of thrust.

Fan pressure ratio (FPR) is the pressure ratio across a blade of the fan section 322 without the use of a fan exit guide vane (FEGV) system. The low fan pressure ratio according to one non-limiting embodiment of the example gas turbine engine 320 is less than 1.45. Low corrected fan tip speed (LCFTS) is the actual fan tip speed divided by an industry standard temperature correction of $[(Tram\ °R)/(518.7°R)]^{0.5}$. The low corrected fan tip speed according to one non-limiting embodiment of the example gas turbine engine 320 is less than about 1150 fps (350 m/s).

Figure 1:
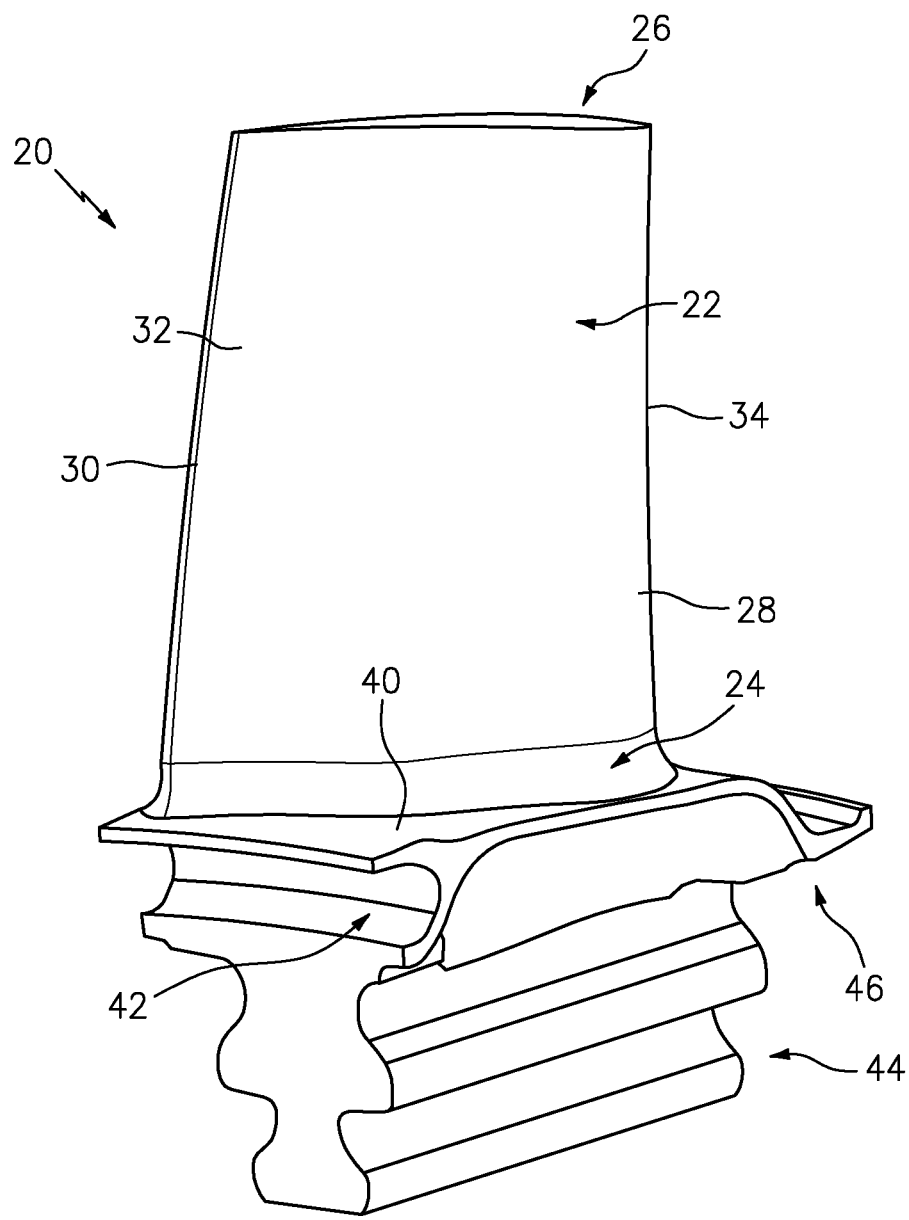
FIG. 1 is a view of a turbine blade.

Turning now to FIG. 1, an engine turbine element 20 is illustrated as a blade (e.g., a high pressure turbine (HPT)) blade having an airfoil 22 which extends between an inboard end 24, and an opposing outboard end 26 (e.g., at a free tip), a distance therebetween extending substantially in the engine radial direction. The airfoil also includes a leading edge 28 and an opposing trailing edge 30. A pressure side 32 and an opposing suction side 34 extend between the leading edge 28 and trailing edge 30.

The airfoil inboard end is disposed at the outboard surface 40 of a platform 42. An attachment root 44 extends radially inward from the underside 46 of the platform.

The turbine blade is cast of a high temperature nickel-based superalloy such as a Ni-based single crystal superalloy (e.g., cast and machined). The superalloy has a density of approximately 0.323 pounds per cubic inch (8.94 g/cm³), more broadly 0.320-0.325 or 0.315-0.330 or 0.30-0.34 pounds per cubic inch (8.86-9.00 or 8.72-9.13 or 8.3-9.4 g/cm³). In addition, the material has a modulus of elasticity of approximately 18.0E06 psi (124 gigapascal (GPa)), more broadly 17.5-18.5E06 psi (121-128 GPa) or 17.0-19.0E06 psi (117-131 GPa) or 16-20E06 psi (110-138 GPa) at room temperature (e.g., 70° F. (21° C.)).

The blade may also have a thermal barrier coating (TBC) system along at least a portion of the airfoil. An exemplary coating covers the airfoil pressure and suction side surfaces and the gaspath-facing surfaced of the platform. The exemplary coating comprises a metallic bondcoat and one or more layers of ceramic (e.g., a YSZ and/or GSZ).

Figure 2:
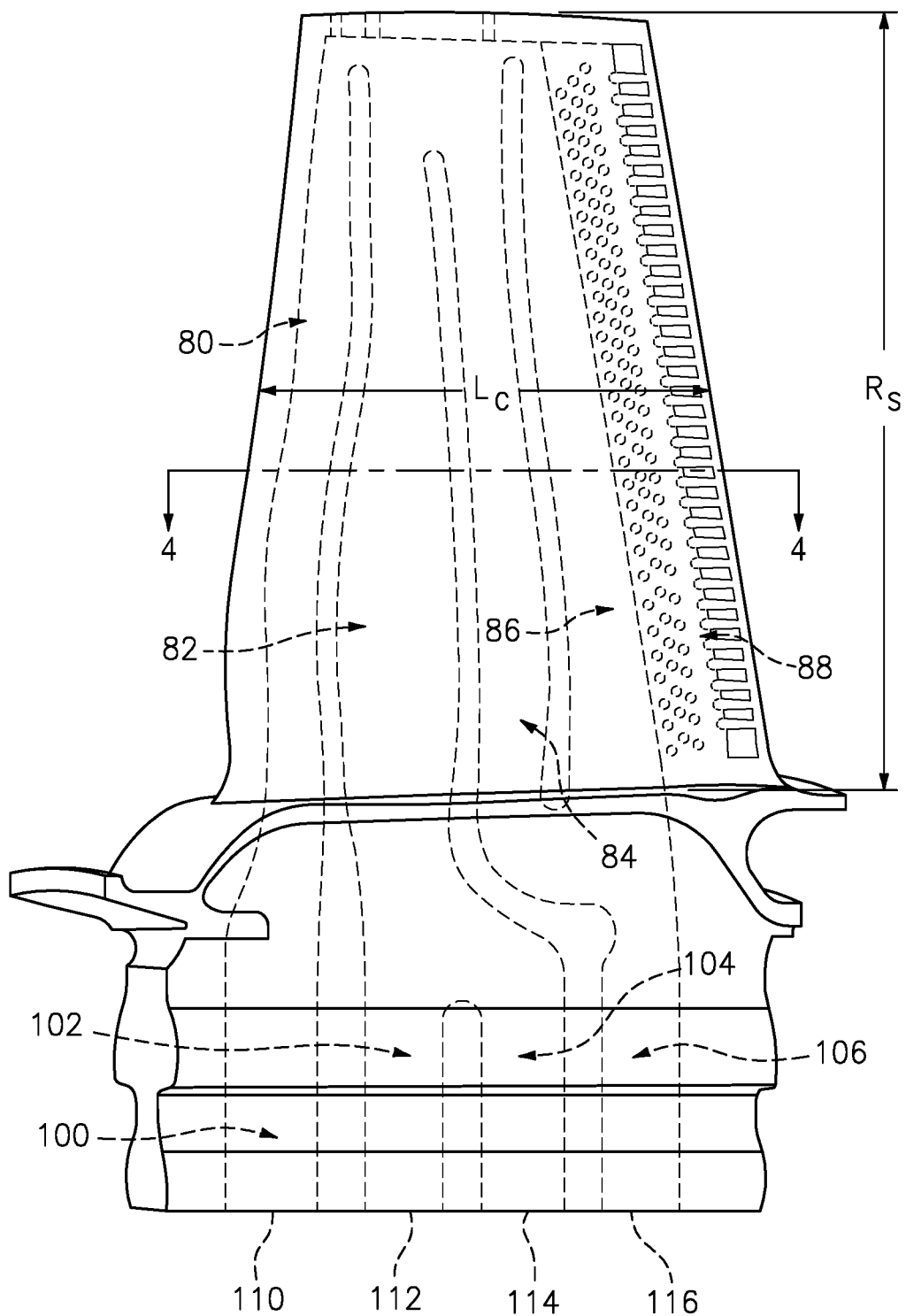
FIG. 2 is an X-ray pressure side view of the blade of FIG. 1.
Figure 3:
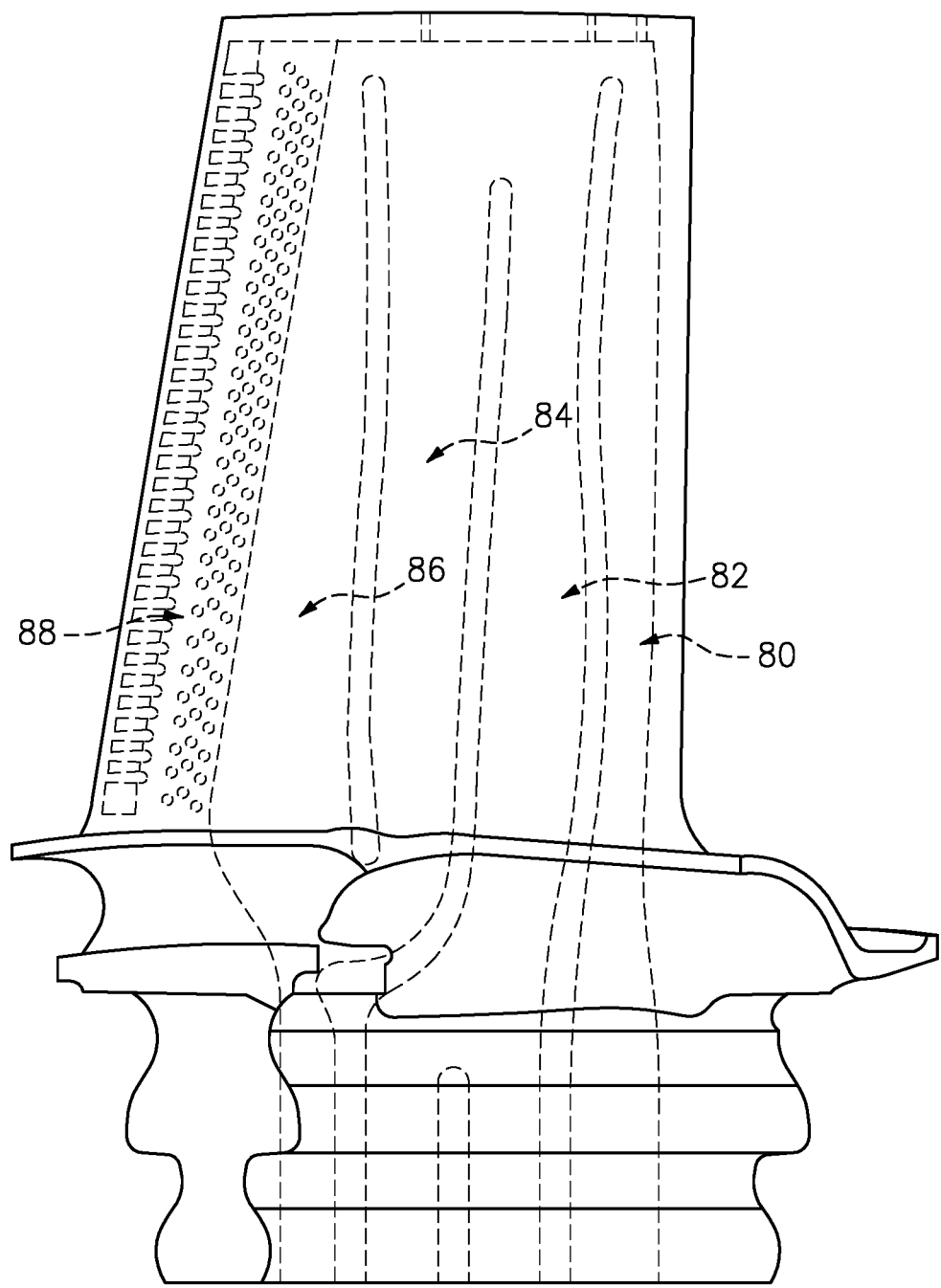
FIG. 3 is an X-ray suction side view of the blade of FIG. 1.
Figure 4:
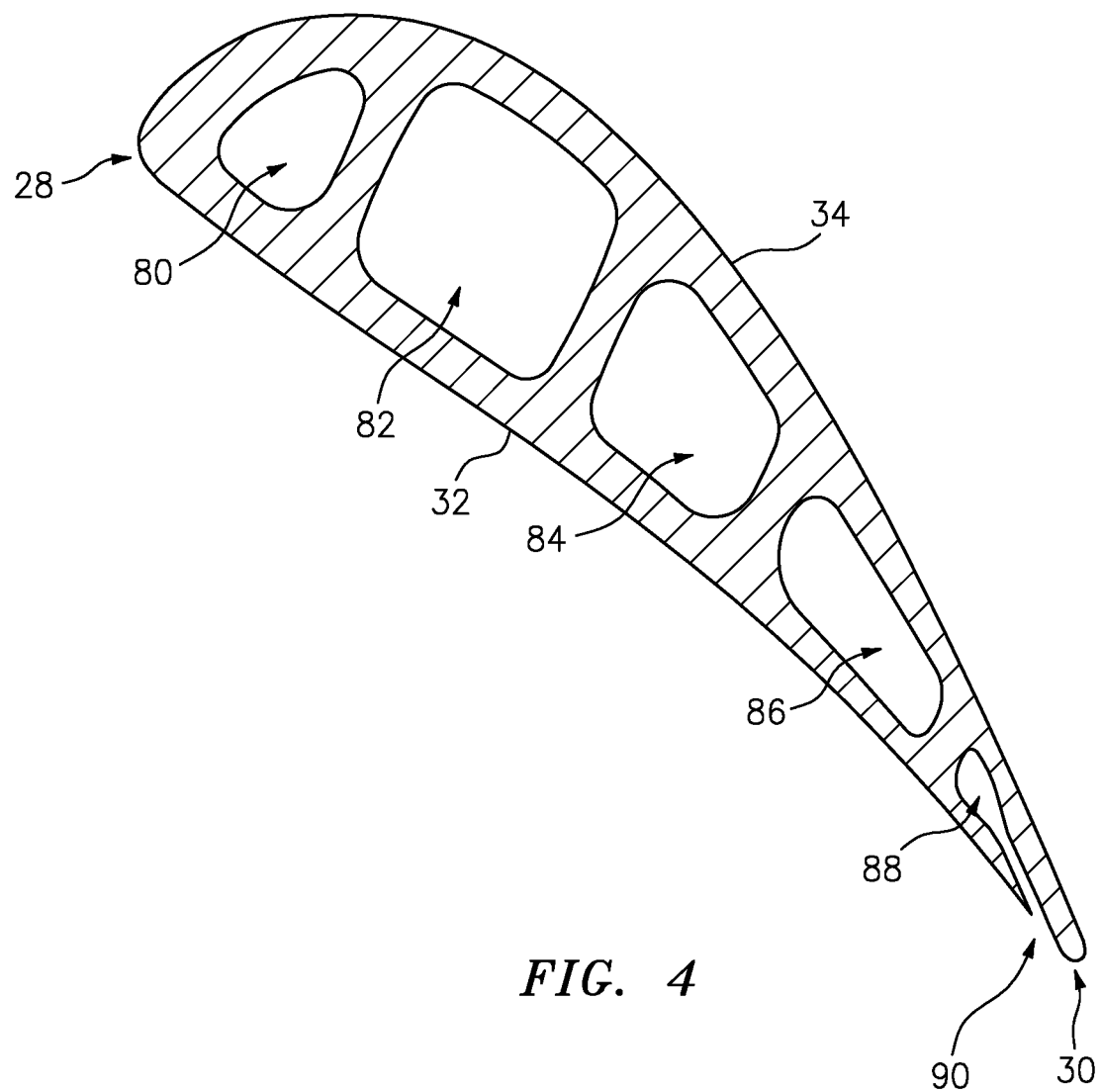
FIG. 4 is a transverse sectional view of the blade of FIG. 1.

FIGS. 2-4 show further details of the blade. FIG. 2 shows an airfoil radial span $R_S$ and a chord length $L_C$. $R_S$ may be defined as the minimum radial distance between the radially outboardmost portion of the platform and the tip (e.g., the outboard end 26). $L_C$ may be defined as the distance from the leading edge to the trailing edge at about 50% span. For example, $R_S$ is 2.02 inches (51.3 mm) and $L_C$ is 1.22 inches (31.0 mm). More broadly, $R_S$ is 1.75-2.20 inches (44.5-55.9 mm) or 1.85-2.20 inches (47.0-55.9 mm) or 1.90-2.20 inches (48.3-55.9 mm) or 1.95-2.08 inches (49.5-52.8 mm) and $L_C$ is 1.05-1.35 inches (26.7-34.3 mm) or 1.10-1.35 inches (27.9-34.3 mm) or 1.17-1.28 inches (29.7-32.5 mm).

The blade has an internal cooling passageway system extending from one or more inlets along a root to a plurality of outlets (along or mostly along the airfoil). FIG. 4 schematically shows spanwise passageways from the leading edge to the trailing edge, which include: a tip impingement cavity/passageway 80, a first radial feed passageway 82, a second radial feed passageway 84, and a trailing edge impingement passageway 86. A trailing edge discharge slot 88 extends from the trailing edge impingement passageway 86 to an outlet 90 at, or near, the actual trailing edge of the blade.

The blade may further include suction side radial flow passageways (not shown, e.g., a microcircuit). Additional outlets (e.g., cast or drilled holes) are not shown but may be present.

The blade also includes a plurality of feed trunks 100, 102, 104, and 106 extending from respective inlets 110, 112, 114, and 116 at the inner diameter (ID) face of the root.

Spanwise arrays of impingement poles extend along impingement walls respectively separating the passageways (e.g., an impingement passageway from a feed passageway). Additionally, various surface enhancements such as posts and pedestals may be provided along the passageways to facilitate heat transfer.

A resonant condition is where a frequency of the excitation coincides with a resonance frequency of the blade, and may result in high vibratory stress. The blade has a resonance profile. There are various modes of resonance, each with its associated resonant frequency. As for blades, six vibratory modes primarily reflect how the blades interact with each other, and with other components of the engine.

U.S. Pat. No. 9,394,793, "Turbomachine Blade", issued Jul. 19, 2016, the disclosure of which is incorporated by reference herein in its entirety as if set forth at length discusses various modes and an associated Campbell diagram of a gas turbine engine.

The modes may be measured "free" at zero speed (with the blade not mounted in an engine or disk or disk-simulating fixture). An exemplary free measurement is performed with the blade suspended by a line such as a string. An exemplary free measurement is performed as a ping test, wherein the blade is pinged via external impact by a hammer. There may be a single strike/ping and an acoustic analysis of the response. Laser vibrometry is an alternative to taking acoustic spectra and is particularly suited to measurements conducted in mounted conditions. Additionally or alternatively, computer modelling (e.g., modeled in a zero gravity simulation for a "free" condition) may be used to determine the modes. Modelling also may allow a graphical display of displacements at a given frequency which may inform locations for modification.

All the modes may also be measured at zero speed with the blade mounted in an engine or disk or disk-simulating fixture. Again, these may be via ping test or computer modelling. For non-zero speed, measurements may be performed with blades installed to a disk or to a full engine or an intermediate level of assembly. Computer modelling may be used or practical measurement such as laser or other optical measurements may be made.

Table I below provides parameters of the particular resonance profile:

TABLE I

| Mode | Nominal Freq. (Hz) Installed | | |
|---|---|---|---|
| | Zero Speed | Idle | Redline |
| M1 | 2400 | 2210 | 2175 |
| M2 | 4950 | 4810 | 4500 |
| M3 | 7800 | 7600 | 7100 |
| M4 | 8700 | 8400 | 7800 |
| M5 | 12500 | 12000 | 11150 |

The modes may or may not correspond to the modes of U.S. Pat. No. 9,394,793. In the exemplary installed condition, the Table I measurements for free and zero speed may be determined by ping testing or modeling. The other measurements may also be determined by modelling using a model of the engine. These may represent a coated blade as discussed above.

Tolerance for the nominal frequencies around these nominal values at each of these speeds is ±10%, more narrowly, ±5%. Exemplary zero speed frequencies are at ambient conditions (e.g., 20-28° C.). For the engine using this airfoil element, exemplary running speeds are: idle speed is an idle speed in the range of 14700-16300 rpm; min. cruise speed is in the range of 19600-23200 rpm; and redline speed is in the range of 23400-26000 rpm.

While resonance frequencies are a function of the blade length, stiffness, and mass, they also represent the unique design characteristic of the blade. During the blade design, the resonance frequencies may be modified by selective modification of the blade airfoil root stiffness, length, chord, external thickness, or internal features (such as but not limited to rib location/thickness, or wall thickness, etc.). Such change in the resonance frequencies would render it acceptable for continued operation in the field without high vibratory stresses which can result in high cycle fatigue cracking. One skilled in vibration analysis and design would understand that these resonance frequency characteristics are unique for each blade and should account for, for example, the specific operational vibratory environment.

The present blade characteristics have been selected such that vibratory modes, which may result in high vibratory stresses at a resonant condition, have been modified. Accordingly, the modes do not occur in the normal engine operating speed range (near idle) and between minimum engine cruise and redline. Vibratory modes, which are not predicted to have a high resonance response, are allowed to have a resonance condition in the normal operating range. As indicated, these evaluations may account for some or more of flowpath temperature and pressure, airfoil length, speed, etc. As a result of the evaluation and the subsequent iterative redesign of the blade, is a blade which is unique for a specific engine in a specific operating condition.

During the design, the blade must be tuned such that the resonance points do not occur in the operating speed range of the engine. To tune the blade, the resonance frequency must be changed, for example, by varying the blade length thickness, moment of inertia, or other parameters. These parameters are modified until the graphical intersections representing unwanted resonance occur outside the operating speed range, or at least outside key operating conditions within the operating speed range. This should be done for each of the first four (or more) vibratory modes of the airfoil, and the blade should be tuned for varying excitation sources. Parameters of the platform and of internal structural features may also be used for tuning. As a practical matter, airfoil external geometry may be decided by aerodynamicists in the design of the engine and there may be none or little flexibility for tuning. The internal cooling passages may be designed by thermal engineers and there may be little flexibility for tuning (but more than with the airfoil exterior). Candidates for internal modifications that influence frequency response without substantially affecting thermal response include minor rib or wall thickening/thinning.

Idle speed is important because the engine may spend much time at idle. Tuning out resonance at minimum cruise and redline speeds are important because engines typically cannot avoid these speeds. A resonance at an excitation frequency at an intermediate speed may be avoided by slightly increasing or decreasing speed.

The frequency response may also be relevant in the repair or remanufacture of blades. There are a number of possible repair and remanufacture techniques, each of which may have a different effect on frequency response. Examples include tip preform repairs and weld buildup repairs (e.g., laser cladding). Due to a need or desire to maintain airfoil external contour, there may be little leeway on the airfoil. Thus, candidates for tuning a remanufactured blade particularly include modifications to the platform. Hardware experiments or modelling may associate a number of particular tuning modifications (e.g., adding a discrete amount of material to or removing a discrete amount of material from a certain location on the platform) with respective changes in frequency response.

Accordingly, after damage or after an initial repair (e.g. restoring airfoil substrate and coating) frequency response measurements may be made. If blade response falls outside of specified tolerance, the nature of the deviations may inform the selection of the type, location, and magnitude of the particular tuning modification. For example, a database of modifications may associate addition of a particular amount of material at a particular location with a particular change in response. Using that database, a computer may select a particular tuning modification or combination to bring the blade within spec. The modification(s) may then be performed and, optionally, the blade retested and further modified if needed.

The use of "first", "second", and the like in the description and following claims does not necessarily indicate relative or absolute importance or temporal or other order and merely may be for differentiation within the claim. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when implemented as a reengineering of one of a baseline engine, details of the baseline engine may influence details of any particular implementation. Accordingly, other embodiments are within the scope of the following claims.

What is claimed is:

1. A combination of a turbomachine blade and a turbine disk or fixture in which the blade is mounted, the blade formed of a nickel-based superalloy and comprising:
    a platform having an outboard surface and an underside;
    an inboard attachment root extending from the platform underside and mounted in the turbine disk or fixture;
    an airfoil having: an inboard end; an outboard end; a leading edge; a trailing edge; a pressure side; and a suction side, the inboard end at the platform outboard surface and the outboard end being a free tip,
  wherein:
    at 70° F. the nickel-based superalloy is a single crystal alloy having a density of 0.315-0.330 pounds per cubic inch and a modulus of elasticity of 17.5-18.5E06 psi;
    a span of the airfoil between the inboard end and the outboard end is 1.75-2.20 inches;
    a chord length at 50% of the span is 1.05-1.35 inches; and
    at a zero speed and ambient conditions:
      a first mode resonance frequency is 2400±10% Hz;
      a second mode resonance frequency is 4950±10% Hz;
      a third mode resonance frequency is 7800±10% Hz;
      a fourth mode resonance frequency is 8700±10% Hz; and
      a fifth mode resonance frequency is 12500±10% Hz.

2. The combination of claim 1 wherein the blade is mounted in said disk in a gas turbine engine wherein, at a running speed/condition:
    the first mode resonance frequency is 2210±10% Hz;
    the second mode resonance frequency is 4810±10% Hz;
    the third mode resonance frequency is 7600±10% Hz;
    the fourth mode resonance frequency is 8400±10% Hz; and
    the fifth mode resonance frequency is 12000±10% Hz.

3. The combination of claim 1, wherein the blade is a casting.

4. The combination of claim 1 further comprising: a cooling passageway system in the airfoil.

5. The combination of claim 4 wherein the cooling passageway system comprises: one or more inlets; and one or more outlets.

6. The combination of claim 1 wherein: said first mode resonance frequency is 2400+5% Hz; said second mode resonance frequency is 4950+5% Hz; said third mode resonance frequency is 7600+5% Hz; said fourth mode resonance frequency is 8400 5% Hz; and said fifth mode resonance frequency is 12500 5% Hz.

7. A turbine engine comprising a turbomachine airfoil element being a blade mounted in a disk of the turbine engine, the blade formed of a nickel-based superalloy and comprising:
    a platform having an outboard surface and an underside;
    an inboard attachment root extending from the platform underside and mounted in the disk;
    an airfoil having: an inboard end; an outboard end; a leading edge; a trailing edge; a pressure side; and a suction side, the inboard end at the platform outboard surface and the outboard end being a free tip,
  wherein:
    at 70° F. the nickel-based superalloy is a single crystal alloy having a density of 0.315-0.330 pounds per cubic inch and a modulus of elasticity of 17.5-18.5E06 psi;
    a span of the airfoil between the inboard end and the outboard end is 1.75-2.20 inches;
    a chord length at 50% of the span is 1.05-1.35 inches; and
    at a running speed/condition:
      a first mode resonance frequency is 2210±10% Hz;
      a second mode resonance frequency is 4810±10% Hz;
      a third mode resonance frequency is 7600±10% Hz;
      a fourth mode resonance frequency is 8400±10% Hz; and
      a fifth mode resonance frequency is 12000±10% Hz.

8. A turbine engine comprising a turbomachine airfoil element being a blade mounted in a disk of the turbine engine, the blade formed of a nickel-based superalloy and comprising:
- a platform having an outboard surface and an underside;
- an inboard attachment root extending from the platform underside and mounted in the disk;
- an airfoil having: an inboard end; an outboard end; a leading edge; a trailing edge; a pressure side; and a suction side, the inboard end at the platform outboard surface and the outboard end being a free tip, wherein:
- at 70° F. the nickel-based superalloy is a single crystal alloy having a density of 0.315-0.330 pounds per cubic inch and a modulus of elasticity of 17.5-18.5E06 psi;
- a span of the airfoil between the inboard end and the outboard end is 1.75-2.20 inches;
- a chord length at 50% of the span is 1.05-1.35 inches; and
- in a running condition:
  - a first mode resonance frequency is 2175±10% Hz;
  - a second mode resonance frequency is 4500±10% Hz;
  - a third mode resonance frequency is 7100±10% Hz;
  - a fourth mode resonance frequency is 7800±10% Hz; and
  - a fifth mode resonance frequency is 11150±10% Hz.

9. A method for remanufacturing a turbine engine airfoil element, the turbine engine airfoil element being a blade formed of a nickel-based superalloy and comprising:
- a platform having an outboard surface and an underside;
- an inboard attachment root extending from the platform underside;
- an airfoil having: an inboard end; an outboard end; a leading edge; a trailing edge; a pressure side; and a suction side, the inboard end at the platform outboard surface and the outboard end being a free tip, the method comprising providing:
  - a first mode resonance frequency is 2400±10% Hz;
  - a second mode resonance frequency is 4950±10% Hz;
  - a third mode resonance frequency is 7800±10% Hz;
  - a fourth mode resonance frequency is 8700±10% Hz; and
  - a fifth mode resonance frequency is 12500±10% Hz, wherein the providing comprises addition of superalloy and said first, second, third, fourth, and fifth mode frequencies are measured with the blade in a turbine engine disk or disk-simulating fixture.

10. The method of claim 9 wherein the providing comprises removal of material after the addition.

11. The method of claim 9 wherein the providing comprises measuring a frequency response after the addition and thereafter further modifying the airfoil via removing or adding superalloy.

12. The method of claim 9 wherein:
- the provided airfoil element has at least one unrestored mode frequency that is attributable to damage to the airfoil element; and
- at least one of the first mode frequency, second mode frequency, third mode frequency, fourth mode frequency, and fifth mode frequency corresponds to a restored mode frequency that supersedes the unrestored mode frequency.

13. The method of claim 9 further comprising:
- applying a thermal barrier coating over the added superalloy.

* * * * *